United States Patent Office 3,729,336
Patented Apr. 24, 1973

1

3,729,336

SURFACE MODIFIED POLYESTER REINFORCING ARTICLES

Gazie K. Ragep, Durham, N.C., assignor to Beaunit Corporation, New York, N.Y.

No Drawing. Filed June 3, 1971, Ser. No. 149,822
Int. Cl. B32b 25/08
U.S. Cl. 117—76 T 5 Claims

ABSTRACT OF THE DISCLOSURE

Surface modified polyester reinforcing articles, such as filament, yarn, tire cord and the like, having improved adhesion when used as reinforcement in rubber articles are provided by cocrystallizing on the surface of a conventional polyester reinforcing article a composition comprising a mixture comprising (1) a copolymer comprising crystallizable ester units identical to those present in the polyester reinforcing article, polyoxyalkylene groups and polyepoxy containing groups and (2) a polyepoxide. The surface modified polyester reinforcing articles are prepared by applying the treating composition to the polyester article and subjecting the surface treated article to a temperature of at least 80° C. for a time sufficient to cause cocrystallization to take place on the surface of the treated polyester article. The polyester article is also treated, preferably by a second coating application, in a normal manner with a conventional polyhydric phenol-aldehyde-rubber latex, and then bonded to rubber using conventional methods. Improved rubber articles reinforced with polyester reinforcing articles are obtained having outstanding adhesion between the rubber and the polyester reinforcing articles.

BACKGROUND OF THE INVENTION

(1) Field of the invention

This invention relates to surface modified polyester reinforcing articles, such as filament, yarn, tire cord and the like, having outstanding adhesion to rubber when used in rubber reinforcing applications.

(2) Description of the prior art

In the manufacture of rubber goods requiring cord reinforcement, such as in pneumatic tires, friction belts, and the like, the strength and durability of the adhesive bond between the cord and the rubber being reinforced is very important. The reinforcing element serves to increase the tensile strength of the rubber article and restrict the degree of distortion under in use conditions. The reinforcing element is normally placed within the mass of the rubber and must be firmly bonded to said compound to provide a unitary structure. Under in use conditions, stresses will occur at the interface between the reinforcing element and the rubber. Good bond strength and adhesion is needed to prevent separation at this interface.

Polyester reinforcing elements are increasingly being used in the reinforcement of such rubber goods and particularly as tire cord in the manufacture of rubber tires. These polyester reinforcing elements, such as polyethylene terephthalate filament or cord, have physical characteristics, such as high strength, flex resistance, high stretching modulus, low creep, and the like, which make them outstanding materials for use in the reinforcement of rubber articles. However, serious problems affect the use of polyester reinforcing elements in rubber reinforcement applications due to the very poor rubber adhesion properties associated with polyester articles.

The use of aqueous dispersions containing a combination of a resorcinol-formaldehyde condensate and a vinyl pyridine latex (referred to as a RFL dip) is best known as an effective treating agent for improving the rubber adhesion of some synthetic polymer reinforcing elements, such as nylon reinforcing elements. However, these RFL dips do not satisfactorily overcome the problems encountered with polyester reinforcing element adhesion. Therefore, attempts have been made to either find new treating agents for improving the rubber adhesion of polyester reinforcing elements or to treat the polyester with additional agents in combination with the RFL dip treatment to improve the adhesion. Although many of these various treatments do, in fact, increase the adhesion between the polyester and the rubber, in many instances the improvement is only slight, in some the treatment requires a number of steps and is not economical, and in others the treatment adversely affects other properties of the reinforcing article, such as causing a hardening or stiffening of the article and adversely affecting further processing.

SUMMARY OF THE INVENTION

It is the primary object of this invention to provide surface modified polyester articles, such as filaments, fibers, threads, yarns, cords, fabrics, webs and the like, having improved adhesion to rubber articles.

Another object of this invention is to provide surface modified polyester articles to which can be applied a coating of a polyhydric phenol-aldehyde-rubber latex treating agent, such as resorcinol-formaldehyde-vinyl pyridine latex, to provide outstanding rubber adhesion properties to the treated surface modified polyester articles.

Another object of this invention is to provide improved rubber adhesion to polyester articles by a method which is convenient and carried out in combination with conventional processing steps.

It is a specific object of this invention to provide surface modified polyethylene terephthalate tire yarn to which can be applied a coating of a resorcinol-formaldehyde-vinyl pyridine latex to provide outstanding rubber adhesion properties to the treated polyethylene terephthalate tire yarn.

Other objects and advantages of the present invention will be apparent from the detailed description which follows.

The objects of this invention are accomplished and the disadvantages found in prior art practices are overcome by providing surface modified polyester articles having improved adhesion when used as reinforcing elements in rubber articles by cocrystallizing on the surface of a conventional polyester article a composition comprising a mixture comprising (1) from about 10 to 50 percent by weight of a polymer comprising from about 15 to 30 percent by weight of crystallizable ester units identical to those present in the polyester article, from about 60 to 80 percent by weight of polyoxyalkylene groups and from about 1 to 25 percent by weight of polyepoxy containing groups and (2) from about 15 to 60 percent by weight of a polyepoxide. Optionally the treating composition may contain from about 10 to 50 percent by weight of a textile lubricant.

The surface modified polyester articles are prepared by applying the treating composition to the surface of the polyester article and subjecting the surface treated article to a temperature of at least 80° C. for a time sufficient to cause cocrystallization to take place on the surface of the treated polyester article.

The surface modified polyester article may be treated in a conventional manner with a conventional polyhydric phenolaldehyde-rubber latex, applied either simultaneously with the initial treating composition or subsequent thereto, and then bonded to rubber using conventional methods.

DESCRIPTION OF THE PREFERRED EMBODIMENTS

The polyester articles treated in accordance with this invention are composed of polyesters which are conventional and well known to those skilled in the art. Illustrative of the polyesters useful in preparing shaped structures, such as filaments, fibers, threads, yarn, cords, fabrics, webs, and the like, which may be treated in accordance with this invention and are thereafter useful in rubber reinforcement applications are those disclosed in U.S. Pats. Nos. 2,465,319, No. 2,965,613 and No. 2,901,466. Polyethylene terephthalate is preferred for use as the reinforcing articles of this invention. Polyethylene terephthalate is obtained by reacting terephthalic acid or dimethyl terephthalate with ethylene glycol under conventional polyester forming conditions. The resulting polymer is then extruded or shaped into the desired article by conventional techniques.

The treating composition critical for the purposes of this invention is composed of (1) a polymer comprised of ester units which are repeat units identical with those forming the crystallizable portions of the polyester article being treated, polyoxyalkylene groups sufficient to render the surface of the polyester article hydrophilic and therefore wettable by water, and polyepoxy containing groups as defined hereafter and (2) a polyepoxide as defined hereafter. Preferably, the treating composition will also contain a lubricating finish which has been found to greatly aid the processing of the treated article in addition to giving improved adhesion properties.

The polymer which is a part of the treating composition should be present in the treating composition in amounts of from about 10 to 50 percent by weight and is comprised of from about 15 to 30 percent by weight of ester units, from about 60 to 80 percent by weight of polyoxyalkylene groups and from about 1 to 25 percent by weight of polyepoxy containing groups. Preferably, the polymer will be present in the treating composition in amounts of from about 25 to 30 percent by weight and be composed of from about 20 to 25 percent by weight of ester units, from about 65 to 75 percent by weight of polyoxyalkylene groups, and from about 5 to 10 percent by weight of polyepoxy containing groups.

The ester units which are a critical part of the polymer are identical with the crystallizable repeat units found in the polyester article to be treated and are believed to cocrystallize with those identical units in the polyester in order to fix the treating composition to the polyester article. When the polyester article to be treated is composed of polyethylene terephthalate as preferred, the ester units will be ethylene terephthalate units.

The polyoxyalkylene groups which are a critical part of the polymer are derived from a polyoxyalkylene glycol having an average molecular weight of from about 300 to 20,000 and preferably having an average molecular weight of from about 1500 to 6000. Suitable polyoxyalkylene groups for the purposes of the present invention include polyoxymethylene, polyoxyethylene, polyoxypropylene, polyoxybutylene, and the like. Preferably, the polyoxyalkylene groups will be polyoxyethylene groups.

The polyepoxy containing groups which are a critical part of the polymer are derived from a polyepoxide having one or more epoxy groups. The epoxy group may be present in an amount greater than 0.20 equivalent per 100 grams of epoxy material as determined by standard analysis and preferably has a molecular weight below about 900 and may be saturated or unsaturated and aliphatic, cycloaliphatic and aromatic, and may be substituted with such radicals as chlorine, hydroxy, alkoxy, and the like. The polyepoxides from which the epoxy radicals are derived are described in detail hereafter.

The treating composition also contains a polyepoxide in addition to the polymer discussed above. This polyepoxide should be identical to the polyepoxide used in the formation of the polymer. Therefore, it is a polyepoxide having one or more epoxy groups. The epoxy group may be present in an amount greater than 0.02 equivalent per 100 grams of epoxy material as determined by standard analysis and preferably has a molecular weight below about 900 and may be saturated or unsaturated and aliphatic, cycloaliphatic and aromatic, and my be substituted with such radicals as chlorine, hydroxy, alkoxy, and the like. Polyepoxide compositions suitable for the purposes of this invention are well known to those skilled in the art and are described in numerous references such as U.S. Pat. No. 2,902,398. Polyglycidic ethers of polyhydric aliphatic alcohols in which there are at least three hydroxy groups, at least two of these hydroxy groups being replaced by the glycidyl ether radical are preferred for use in the treating compositions of this invention, both as an ingredient in the polymer which forms a part of the treating composition and as a separate ingredient of the treating composition Polyglycidic ethers of this type may be represented by the following structural formula

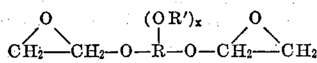

wherein R represents a straight or branched chain alkylene group having up to 10 carbon atoms, preferably 3 to 6 carbon atoms, R' represents hydrogen or the glycidic radical

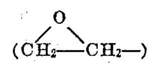

and $x$ is a small whole integer, preferably an integer of 1 to 6, inclusive. A particularly effective polyglycidic ether for use with this invention is prepared by the reaction of epichlorohydrin and glycerol. This reaction is well known and is described in detail in the preparation of polyether A at column 4 of U.S. Pat. No. 2,902,398.

The treating composition may also contain from about 10 to 50 percent by weight of a textile lubricant and preferably from about 20 to 30 percent by weight of the lubricant. The use of the textile lubricant is optional to this invention. However, the inclusion of a textile lubricant in the treating composition aids in the later processing of the treated article into many reinforcing applications. Suitable textile lubricants are those well known in the art, such as a mineral or vegetable oil as, for example, a light mineral oil, olive oil, sperm oil, or a processed oil such as a sulfonated castor oil, or a synthetic material such as a silicone oil.

The polymers which form a critical part of the treating composition are conveniently prepared by reacting the ester forming reactants, such as ethylene glycol and terephthalic acid or ester forming derivatives thereof, a polyoxyalkylene glycol, and a polyepoxide under conventional esterification and polymerization techniques. The viscosity of the polymer useful for the purposes of this invention should range from above 0.3 to below 0.55 and, preferably will range from about 0.4 to 0.5 as measured in a 0.4 percent solution in trifluoroacetic acid at 30° C.

In order to obtain a durable bonding between the treating composition and the polyester article treated, it is necessary that the treating composition be crystallizable. However, it is not necessary that the treating composition be applied to the surface of the polyester article in a crystalline form. The treating composition may be applied to the polyester article as a molten material, as a solution in a plasticizer for the polyester being treated, as a solution in a solvent which does not plasticize the polyester being treated, or as a suspension or dispersion of the treating composition in a liquid medium. A preferred method of applying the treating composition is from a dispersion in water or aqueous medium.

In order to produce a durable surface treatment it is necessary to heat the article after applying the treating composition thereto. A temperature of above 80° C. is required to produce a durable surface treatment. A heat treatment in the range of from about 80° C. to just below the melting point of the polyester article being treated for a time sufficient to cause cocrystallization to take place between the ester units of the treating composition and the polyester being treated has been found to be satisfactory. It has been found that a heat treatment at a temperature of about 100 to 220° C. for a period of from about 0.5 second to 2 minutes provides very satisfactory results.

The treating composition should be applied to the surface of the polyester article so that from about 0.3 to 1.5 percent by weight solids are present on the surface of the polyester.

A preferred procedure for the preparation of the surface modified polyester articles of this invention involves dispersing the polymer comprising about 20 to 25 percent by weight of the ester units, about 65 to 75 percent by weight of the polyoxyalkylene groups, and about 5 to 10 percent by weight of the polyepoxy containing groups in water at about 40 to 60° C. to provide about a 10 to 30 percent by weight solids dispersion. To this dispersion sufficient amounts of the polyepoxide and, preferably, a textile lubricant are added to provide a dispersion of about 23 to 25 percent by weight solids comprising about 20 to 40 percent by weight of the polymer, about 30 to 60 percent by weight of the polyepoxide, and about 20 to 30 percent by weight of the textile lubricant. This dispersion is applied to the surface of the polyester article, preferably in filament form, and the treated article is then heated at a temperature of about 135° C. for about 5 seconds to attain a durable coating of the treating composition upon the article in the amount of about 0.9 percent by weight solids on the surface of the article.

In the preparation of the surface modified articles of this invention, other conventional modifying agents, such as delustrants, antioxidants, plasticizers, stabilizers, and the like, may be incorporated in the polyester article and/or in the treating compositions.

Many bonding agents for polyester filaments or yarns cause the treated filaments or yarns to become relatively stiff and inflexible. The treatment of this invention does not affect the polyester article in such a way and the article remains quite flexible. Therefore, the treatment of the polyester article may be carried out at any time after the initial shaping of the polyester reinforcing article, e.g., before or after filaments have been formed into threads, yarns, cords, fabrics or the like. The heat fixed base coating comprising the polymer comprising the ester units, polyoxyalkylene units, and epoxy units and the polyepoxide is applied to the article and simultaneously therewith or preferably thereafter a second coating comprising a known polyhydric alcohol-aldehyde-latex bonding agent is applied in a known manner. The overall two-stage coating process yields a polyester article with outstanding rubber adhesion properties. Compositions produced according to the present invention may be utilized for a wide variety of important industrial applications. They are of particular value in the preparation of pneumatic tires for automobiles, tractors, busses, aircraft, and the like as well as in the preparation of conveyor belts, hoses, transmission belts, raincoats, and the like.

The surface modified polyester articles of this invention are normally treated with the polyhydric alcohol-aldehyde-latex adhesive mixture before the article is bonded to rubber. These polyhydric alcohol-aldehyde-latex adhesive mixtures are well known and conventional to the art. Preferably, the surface modified polyester articles are given a second coating of a composition containing a resorcinol-formaldehyde condensate and a butadiene-styrene-vinylpyridine latex to provide about 4 to 8 percent by weight solids on the surface of the polyester article. The resorcinol-formaldehyde-latex composition may also contain other known adhesive additives such as a blocked diisocyanate if so desired.

The polyester article is then bonded to rubber to provide products for a wide variety of important industrial applications. The final product is of particular value in pneumatic tires for automobiles, busses, tractors, aircraft, and the like. The bonding of the reinforcing article to the rubber in the final product is accomplished by conventional and well known techniques. The nature of the rubber in the final reinforced shaped structure is not critical. It may be either a natural or a synthetic rubber. The rubber stock used may contain conventional additives, such as stabilizers, vulcanizers, antioxidants, fillers, pigments and the like, if desired.

The following examples are used to illustrate the present invention and are not intended to limit it in any way. Unless otherwise noted percentages as expressed in the examples indicate percent by weight.

The polyester tire cord used in the examples is prepared using conventional methods. Polyethylene terephthalate is prepared from dimethyl terephthalate and ethylene glycol and melt spun into filaments which are combined into yarn. The adhesion treatments of the examples are applied to the yarn and the treated yarn is drawn and then processed into tire cord consisting of 3 plies having 9S twist and 9Z twist. The tire cord is subjected to a conventional H-Block test in which the treated cord is cured across the center of two small (3/8 inch width) rectangles of rubber with a short length of the cord between the rubber pieces forming the crossbar of the H. The pieces of rubber are gripped in an Instron Tensile Testing Machine and stress is applied so that the cord is pulled out from one of the pieces of rubber. The load required is regarded as a measure of the adhesion.

The polymers which form a critical part of the treating compositions of this invention and used in the examples which follow may be prepared as follows: The necessary quantities of dimethyl terephthalate, ethylene glycol, polyoxyethylene glycol having an average molecular weight of 4000 and the polyglycidic ether as prepared below are heated at 165° C. Until the theoretical amount of methanol is distilled off. The mixture is then slowly heated to 220° C. to drive off any remaining methanol. A small amount (0.1%) of antimony trioxide catalyst is added to the reaction mixture and the mixture is polymerized at a temperature of about 275° C. and under a vacuum of 2 mm. for a period of about 1½ hours to obtain a polymer having an intrinsic viscosity of about 0.4 to 0.5.

The polyglycidyl ether used throughout the examples is the reaction product of epichlorohydrin and glycerol and may be prepared as follows: About 276 parts (3 moles) of glycerol is mixed with 832 parts (9 moles) of epichlorohydrin. To this reaction mixture is added 10 parts of diethyl ether solution containing about 4.5 percent boron trifluoride. The temperature of this mixture is kept between 50° C. and 75° C. for about 3 hours. About 370 parts of the resulting glycerol-epichlorohydrin condensate is dissolved in 900 parts of dioxane containing about 300 parts of sodium aluminate. With agitation, the reaction mixture is heated and refluxed at 93° C. for 9 hours. After cooling at atmospheric temperature, the insoluble material is filtered from the reaction mixture and low boiling substances removed by distillation to a temperature of about 150° C. at 20 mm. pressure. Two hundred and sixty-one parts of the polyglycidyl ether is obtained. This polyglycidyl ether is a pale yellow viscous liquid having a molecular weight of about 324 and an epoxide value of about 0.671 equivalent per 100 grams.

EXAMPLE 1

An RFL adhesive mixture was prepared as follows: Eleven parts by weight of resorcinol, 16.2 parts by weight of 37% formaldehyde, 0.3 part by weight of sodium hydroxide, and 238.5 parts by weight of water were mixed, aged for six hours at 75–78° F. and then added to a mixture of 244 parts by weight of 41% solids butadiene-styrene-vinylpyridine polymer latex (70:15:15) diluted with 60 parts by weight of water.

The RFL mixture was applied to the polyethylene terephthalate yarn to provide a dry solids pick-up of about 4.5 percent by weight. The yarn was processed into tire cord and the treated cord was cured at about 430° F. for about one minute, then bonded to rubber stock and then tested for adhesion using the H-Block test. A value set at 100 was obtained.

EXAMPLE 2

A polymer having an intrinsic viscosity of 0.45 and comprising about 22 perecnt by weight of ethylene terephthalate units, about 71 perecnt by weight of polyoxyethylene groups which have been derived from a polyoxyethylene glycol of an average molecular weight of about 4000, and about 7 percent by weight of a polyglycidic ether component derived from the reaction product of glycerol and epichlorohydrin is dispersed in water at about 40 to 60° C. to provide about a 20 percent by weight solids dispersion. To the dispersion sufficient amounts of the polyglycidic ether obtained by the reaction of glycerol and epichlorohydrin, and a mineral oil based textile lubricant were added to provide a dispersion of about 24 percent by weight solids comprising about 28 percent by weight of the polymer, about 47 perecnt by weight of the polyglycidic ether, and about 25 percent by weight of the textile lubricant.

This dispersion was applied to the polyethylene terephthalate yarn and the yarn was heated at about 135° C. for about 5 seconds to atttain a durable coating of the treating composition upon the article in the amount of about 0.9 percent by weight solids on the surface of the article.

The treated yarn was then coated with the RFL mixture as described in Example 1, processed into tire cord, bonded to rubber stock, and tested for adhesion using the H-Block test. An adhesion rating of 326 as compared to a rating of 100 for the control was obtained.

EXAMPLE 3

A suspension of about 5 percent by weight solids comprising about 72 percent by weight of a phenol blocked methylene-bis-(4-phenylisocyanate), about 27 percent by weight of the polyglycidic ether obtained by the reaction of glycerol and epichlorohydrin and about 1 percent by weight of a natural gum was applied to a polyethylene terephthalate yarn and then dried at about 440° F. for about 1 minute.

The treated yarn was then coated with the RFL mixture as described in Example 1, processed into tire cord, bonded to rubber stock, and tested for adhesion using the H-Block test. An adhesion rating of 246 was obtained.

EXAMPLE 4

Polyethylene terephthalate yarn was precoated with the composition of this invention as described in Example 2 and then subjected to the treatment as described in Example 3. An adhesion rating of 366 was obtained as compared to a rating of 246 for the commercial treatment as represented by Example 3.

EXAMPLE 5

A suspension of about 20 percent by weight solids comprising 77 percent by weight of the RFL mixture as described in Example 2 and about 23 percent by weight of H–7 adhesive additive was applied to a polyethylene terephthalate yarn and then dried at about 450° C. for about 1 minute. H–7 adhesive additive is a commercially available additive for polyester rubber adhesion sold by I.C.I. Organics, Inc. of Stamford, Conn. and is a solution of a complex phenolic based compound in dilute ammonia.

The treated yarn was then processed into tire cord, bonded to rubber stock, and tested for adhesion using the H-Block test. An adhesion rating of 334 was obtained.

EXAMPLE 6

Polyethylene terephthalate yarn was precoated with the composition of this invention as described in Example 2 and then subjected to the treatment as described in Example 5. An adhesion rating of 464 was obtained as compared to a rating of 334 for the commercial treatment as represented by Example 5.

EXAMPLE 7

Polyethylene terephthalate yarn was treated as described in Example 2 except that the precoating dispersion comprised only the polymer and did not contain the polyepoxide or the textile lubricant.

The treated yarn was then processed into tire cord, bonded to rubber stock, and tested for adhesion using the H-Block test. An adhesion rating of 270 was obtained as compared to a rating of 326 obtained in Example 2.

EXAMPLE 8

Polyethylene terephthalate yarn was treated as described in Example 2 except that the precoating dispersion comprised only the polyepoxide and did not contain the polymer or the textile lubricant.

This treated yarn was then processed into the tire cord, bonded to rubber, and tested for adhesion using the H-Block test. An adhesion rating of 246 was obtained as compared to a rating of 326 obtained in Example 2.

It is to be understood that changes and variations may be made from the foregoing embodiments of the present invention without departing from the spirit and scope thereof as defined in the appended claims.

What is claimed is:

1. A surface modified polyester article useful in rubber reinforcement applications comprising a polyester having cocrystallized on the surface thereof, a composition comprising a mixture comprising (1) about 10 to 50 percent by weight of a copolymer comprising about 15 to 30 percent by weight of ester units identical to those present in the polyester, about 60 to 80 percent by weight of polyoxyalkylene groups, and about 1 to 25 percent by weight of polyepoxy containing groups derived from a polyepoxide having at least one epoxy group and (2) about 15 to 60 percent by weight of a polyepoxide, said polyepoxide being identical to the polyepoxide used in the preparation of said copolymer.

2. A surface modified polyester article as defined in claim 1 wherein said mixture also contains from about 10 to 50 percent by weight of a textile lubricating agent.

3. A surface modified polyester article as defined in claim 1 wherein the polyester is comprised of polyethylene terephthalate, the copolymer is comprised of ethylene terephthalate units, polyoxyethylene groups having an average molecular weight of about 1500 to 6000, and a polyglycidic ether radical derived from the reaction product of epichlorohydrin and glycerol and the polyepoxide is comprised of the polyglycidyl ether which is the reaction product of epichlorohydrin and glycerol.

4. A rubber article reinforced with a surface modified polyester article as defined in claim 1.

5. The surface modified polyester article as defined in claim 3 having distributed on the surface thereof a coating comprised of a polyhydric alcohol-aldehydevinyl pyridine latex adhesive.

References Cited

UNITED STATES PATENTS

| | | | |
|---|---|---|---|
| 2,902,398 | 9/1959 | Schroeder | 117—76 X |
| 3,247,043 | 4/1966 | Cardina | 117—138.8 X |
| 3,297,468 | 1/1967 | Mecura et al. | 117—138.8 X |
| 3,383,242 | 5/1968 | Mercura et al. | 117—138.8 |
| 3,416,952 | 12/1968 | McIntyre et al. | 117—139.5 X |
| 3,619,269 | 11/1971 | McIntyre et al. | 117—138.8 X |
| 3,625,754 | 12/1971 | Dunn | 117—138.8 |

WILLIAM D. MARTIN, Primary Examiner

S. L. CHILDS, Assistant Examiner

U.S. Cl. X.R.

117—138.8 , 139.5 CQ, 139.5 F; 260—835